G. T. FORSYTH.
UNIVERSAL JOINT.
APPLICATION FILED JUNE 21, 1920.

1,403,679.

Patented Jan. 17, 1922.

George T. Forsyth
INVENTOR.

BY
Louis Quaile
ATTORNEY.

UNITED STATES PATENT OFFICE.

GEORGE T. FORSYTH, OF ST. PAUL, MINNESOTA.

UNIVERSAL JOINT.

1,403,679. Specification of Letters Patent. Patented Jan. 17, 1922.

Application filed June 21, 1920. Serial No. 390,309.

*To all whom it may concern:*

Be it known that I, GEORGE T. FORSYTH, a citizen of the United States, and resident of St. Paul, in the county of Ramsey and State of Minnesota, have invented certain new and useful Improvements in Universal Joints; and I do hereby declare that the following is a full, clear, and exact description thereof.

My invention relates to new and useful improvements in universal joints for transferring rotation from a drive shaft to an angularly related driven shaft, the present type of joint being of the same general nature as the joint shown in my co-pending application for patent filed March 12, 1920, Serial Number 365,150, wherein each of the shafts is provided with a series of prongs connected by flexible members with the non-opposite prongs of the other shaft whereby the relative movements of the prongs incidental to rotation of the joints are permitted by flexure of the connecting members, thus providing a durable joint which does not require the provision of machined bearing surfaces and which will prove efficient and durable in continued use without the requirement of lubrication or housing protection.

It is the object of my present invention to simplify the structure of a universal joint of this character whereby to avoid the necessity of crossing the flexible connecting members of the shaft prongs and whereby a more compact arrangement may be effected.

With the above and other objects and advantages in view, my invention resides more particularly in the novel combination, formation and arrangement of parts hereinafter described and pointed out in the appended claims.

In the accompanying drawings

Figure 1:
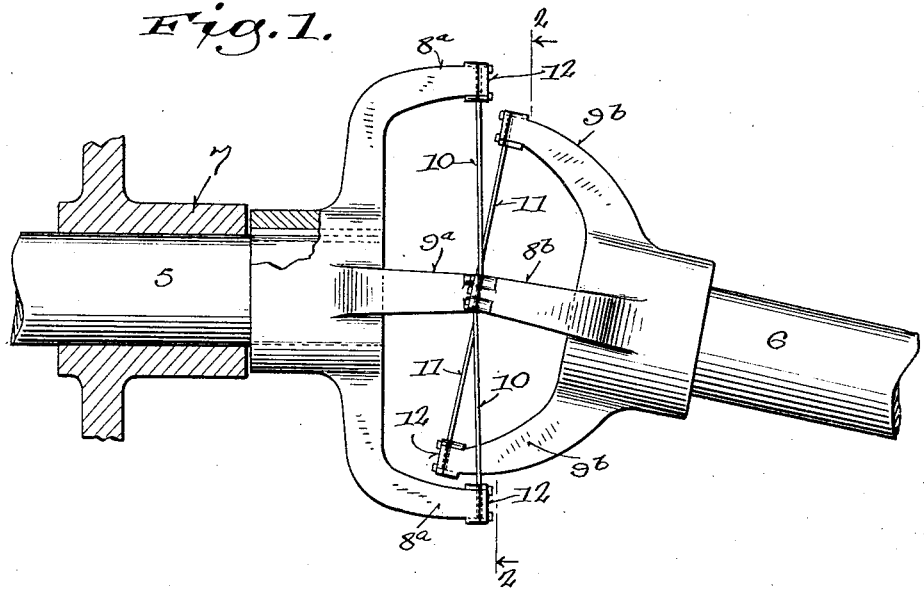
Figure 1 is a side elevational view of my improved universal joint.
Figure 2:
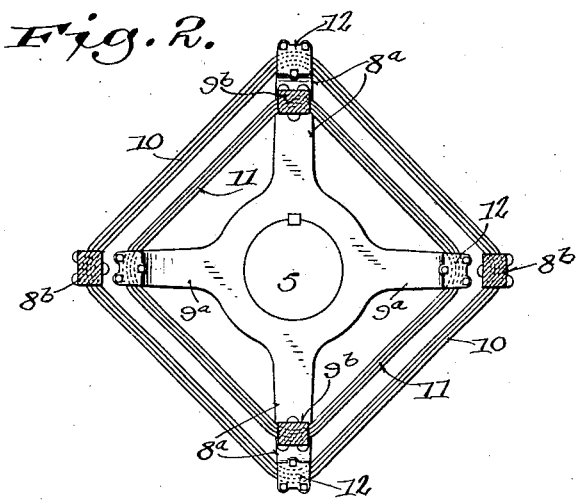
Figure 2 is a sectional view on the plane indicated by line 2—2 of Figure 1.

Referring now more particularly to the accompanying drawings, 5 and 6 designate a pair of shafts carried by suitable bearing 7 and disposed in angular relation with their axes intersecting at a point intermediate of their opposed ends. Each of the shafts carries a series of radial arms or prongs having their end portions directed toward the point of intersection, each set of prongs being in the present instance four in number and comprising a pair of relatively short prongs and a pair of relatively long prongs, the long and short prongs of the shaft 5 being designated by the numerals $8^a$ and $9^a$, while the long and short prongs of the shaft 6 are designated by the numerals $8^b$ and $9^b$. The prongs $8^a$ and $8^b$ are of equal dimensions and have their end portions disposed at the outer sides of the end portions of the prongs $9^a$ and $9^b$, which are also of equal dimensions and hence equally spaced from the point of intersection of the shafts. The long and short prongs are hence radially aligned and disposed in circles concentric with the point of intersection of the shaft axes. The long prongs $8^a$ and $8^b$ are connected by a flexible medium formed in the present instance by a band of cables 10, while the short arms $9^a$ and $9^b$ are connected by a band of cables 11, the cables 11 connecting the shorter prongs being somewhat heavier than the other cables due to the fact that the arms of the torsional moments are unequal. The cables may be secured to the ends of the prongs in any suitable manner, preferably by clamp plates 12 bolted to the ends of the prongs, and clamping the cables between said plates and the end faces of the prongs. A series of relatively small cable sections may be provided in each stretch to give a desired flatness to the connecting medium reducing the dimensions thereof in the direction of flexure and hence reducing the secondary stress of flexure incidental to operation of the joint.

The present structure is thus exceedingly simple in nature, since by making the shaft prongs of unequal length, I provide an outer cable loop and an inner cable loop disposed wholly within the confines of the outer loop and I thus avoid the necessity of crossing the cables, and eliminate the spider and spacing arms employed in my said co-pending application to prevent contact of the cross-cables, thus also permitting a relatively compact arrangement, although the structure of my copending application may be desirable in certain uses.

While I have shown and described a preferred embodiment of my invention, it will be understood that various changes and modifications of structure may be employed to meet differing conditions of use and manufacture without departing in any manner from the spirit of my invention, and if desired the means for connecting the various prongs may constitute strips of resilient metal, or any other structure permitting the relative movement of the prong ends about spherical surfaces having as their center the axis of intersection of the shaft ends.

Also, the number of prongs carried by each shaft may be increased in multiples of two to provide for additional concentric cable loops.

What is claimed is:

1. A universal joint comprising a pair of opposed shafts having intersecting axes, a set of prongs projecting from each shaft, the individual prongs of each set being spaced different distances from the axis of the shaft, and members connecting the prongs of one shaft with relatively remote prongs of the other shaft.

2. A universal joint comprising a pair of opposed shafts, a set of individual prongs projecting from each shaft, the prongs of each set being disposed different distances from the axis of the shaft, a flexible loop connecting outer prongs of said sets, and a flexible loop connecting inner prongs of said sets and disposed wholly within the confines of the first loop.

3. A universal joint comprising a pair of opposed shafts having intersecting axes, a pair of prongs carried by each shaft, a second pair of prongs carried by each shaft and spaced greater distances from the axis of the shaft and disposed at the outer sides of the first recited prongs of the other shaft to define series of prongs disposed in concentric circles, and members connecting the prongs of each circle.

4. A universal joint comprising a pair of opposed shafts having intersecting axes, a pair of prongs carried by each shaft, a second pair of prongs carried by each shaft and spaced greater distances from the axis of the shaft and disposed at the outer sides of the first recited prongs of the other shaft to define series of prongs disposed in concentric circles, and a cable connecting the prongs of each circle.

In testimony that I claim the foregoing I have hereunto set my hand at St. Paul, in the county of Ramsey and State of Minnesota.

GEORGE T. FORSYTH.